3,122,591
CHEMICAL DEHYDROHALOGENATION OF 1,2-DICHLOROETHANE TO YIELD VINYL CHLORIDE
Kenneth C. Eberly, Akron, Ohio, assignor to The Firestone Tire & Rubber Company, Akron, Ohio, a corporation of Ohio
No Drawing. Filed Apr. 4, 1957, Ser. No. 650,572
7 Claims. (Cl. 260—656)

This invention relates to a process for the production of monomeric vinyl chloride and, more particularly, to a process for the production of vinyl chloride by chemical dehydrohalogenation of 1,2-dichloroethane.

Vinyl chloride is a chemical of marked importance in modern chemical industry. The most important of the vinyl halides, vinyl chloride is, of course, the monomer most used in the production of the very popular homopolymeric and copolymeric plastic materials generically referred to as "vinyls." These plastic materials appear commercially in either intermediate form as molding powders, plastisols and the like or as finished articles of commerce such as sponge, flooring, fibers, fabrics, films for packaging and the like. As the scope of application and the use of these vinyl plastic materials increase, the importance of vinyl chloride, the basic commodity, likewise increases.

Chemical dehydrohalogenation of 1,2-dichloroethane to produce vinyl chloride has been known in the art and has been practiced on a comparatively wide scale. The prior art processes, however, have exclusively employed alkali metal hydroxides, specifically sodium or potassium hydroxide, as the dehydrohalogenation agents. These hydroxides have been employed by the art either in aqueous solutions, in mono- or polyhydric alcohol solutions, or in alcohol-water solutions.

The use of aqueous alkali metal hydroxides generally has been characterized by the formation of undesired by-products such as acetylene and ethylene glycol. Reduction in the formation of these by-products has required costly and inefficient excesses of ethylene dichloride or meticulous control of process conditions. Moreover, for best results more expensive alcohol reaction mediums have been substituted for aqueous systems.

In addition to the formation of undesired by-products, the alkali metal hydroxide dehydrohalogenation agents of the prior art processes have necessitated use of expensive corrosion-resistant apparatus. Additionally, if alcohols are used in the process, not only must the added expense of the alcohol be allotted to the process but the additional problem of alcohol recovery from azeotropic mixtures also must be confronted.

Accordingly, it is a primary object of the present invention to provide a process for the chemical dehydrohalogenation of 1,2-dichloroethane which will produce vinyl chloride in commercially desirable yields without any appreciable by-product formation.

A further object of the invention is to produce vinyl chloride by a chemical dehydrohalogenation process which utilizes a chemical dehydrohalogenation agent much less corrosive than the alkali metal hydroxides of the prior art.

An additional object of this invention is the production of vinyl chloride without appreciable formation of by-products by the chemical dehydrohalogenation of 1,2-dichloroethane in an aqueous system of the dehydrohalogenation agent.

It is a still further object of this invention to produce vinyl chloride in commercially acceptable yields by the chemical dehydrohalogenation of 1,2-dichloroethane utilizing a materially less expensive dehydrohalogenation agent than those heretofore employed by the art.

In accordance with the present invention, it has been discovered that 1,2-dichloroethane can be converted to vinyl chloride by reaction with calcium hydroxide. Though ethylene dichloride is not dehydrohalogenated even by boiling aqueous calcium hydroxide at atmospheric pressure, it has now been discovered that by conducting the reaction at superatmospheric pressures, vinyl chloride is produced in good yield. The reaction of ethylene dichloride and calcium hydroxide in accordance with the invention has been found to produce vinyl chloride with no apparent side reactions. Moreover, the ratio of the reactants is not critical and careful control of the reaction is unnecessary.

A further advantage of the present invention stems from the use of a divalent calcium hydroxide, which on a theoretical molar basis, is capable of reacting with twice the molar quantity of hydrogen and chlorine as compared with the mono-valent alkali metal hydroxides of the prior art dehydrohalogenation processes. Converted to a weight basis, the production of a gram mole of vinyl chloride (62.5 grams) from 1,2-dichloroethane requires 40 grams of sodium hydroxide, but only 37 grams of calcium hydroxide. Hence, applicant's process not only utilizes the least expensive hydroxide available but, additionally, exhausts smaller amounts of hydroxide than the prior art processes.

Generally described, therefore, the present invention comprises a process for the production of vinyl chloride by the chemical dehydrohalogenation of 1,2-dichloroethane which comprises reacting 1,2-dichloroethane with calcium hydroxide at pressures above atmospheric and at a temperature above about 125° C.

In the preferred process embodiment of the invention, calcium hydroxide is employed in aqueous slurry at pressures within the range of 90 to 150 p.s.i.g. and temperatures within the range of 125° to 200° C. Although the stoichiometric ratio of calcium hydroxide to ethylene dichloride is not critical, it is preferred to employ from about 50 to about 100% excess calcium hydroxide based on theoretical requirements.

If the invention is practiced as a batch process, the following procedure has been found to give excellent results. The calcium hydroxide is first produced by slaking calcium oxide with water. After slaking, the mixture of calcium hydroxide and 1,2-dichloroethane is placed in a steel reaction vessel equipped with a reflux condenser. The reactants in the pressure vessel are subjected to an initial pressure, preferably at least 50 p.s.i.g., by compressed air or other gas inert in the reaction, after which the air inlet connection is disconnected and heat is applied externally to the vessel. Agitation of the mixture is advantageous in promoting intimate contact of the reactants but is not critical to the operability of the process. As the reaction mixture is heated and the reaction commences, the gaseous vinyl chloride product will cause the pressure in the vessel to rise. The vinyl chloride effluent is then bled from the system through the overhead condenser at a rate sufficient to keep the pressure within the desired range while the heat input is regulated to maintain the temperature at the desired level. The overhead condenser is maintained at a temperature which is cool enough to condense the reactants but not the vinyl chloride which passes through the condenser as a gas. The gaseous product which is drawn off may be refrigerated by any suitable means and condensed. After the reaction has abated, the pressure in the vessel is bled off slowly to prevent ebullition within the vessel. Vinyl chloride dissolved in the reaction mixture is distilled off by refluxing at atmospheric pressure.

As will be apparent to those skilled in the art, the process of the invention may be practiced in a continuous manner, and while specifically illustrated by batch processes, the invention contemplates continuous processes as well.

Having generally described the invention specific embodiments are illustrated in the examples which follow. These examples, included for illustrative purposes only, are in no way intended to limit the scope of this invention.

The apparatus used in the following examples consisted of a stainless steel bomb, 7.8 cm. inside diameter and 24.3 cm. deep. The pressure cap of the bomb was fitted with a thermometer well and a stainless steel, water-cooled condenser. The condenser, cooled with 10° C. water, was equipped at its outlet with a 0–500 p.s.i.g. pressure gauge and needle valve through which reacted vinyl chloride could be bled from the system. A gas burner was utilized to apply external heat to the system.

*Example I*

A mixture of 28.1 grams (0.500 gram-mole) of calcium oxide and 250 ml. of distilled water was placed in the bomb. After sufficient time had been allowed for slaking, the mixture was stirred and 49.5 grams (0.500 gram-mole) of pure ethylene dichloride were added. The bomb was assembled, the internal pressure was raised to 50 p.s.i.g. with compressed air, and external heat was applied to the mixture. Gradual heating brought the pressure to 105 p.s.i.g. and the temperature to 138° C. Gaseous vinyl chloride was slowly bled from the outlet of the reflux condenser in an effort to maintain a pressure of approximately 100 p.s.i.g. The reaction continued for the next 100 minutes before it showed signs of abating. The final temperature of the mixture was 155° C. with an accompanying pressure of 135 p.s.i.g.

After the heat had been removed and the pressure reduced, the excess calcium hydroxide was dissolved in exactly 50 ml. of concentrated nitric acid and 1.1 grams (0.011 gram-mole) of unreacted 1,2-dichloroethane were recovered from the mixture. The aqueous portion was then diluted to 2000.0 ml. and a 10.00 ml. aliquot was titrated for chloride ion content according to Volhard's method. The titration required 20.21 ml. of 0.10313 N silver nitrate solution indicating that 83.4% of the 1,2-dichloroethane had been converted.

*Example II*

A mixture of 21.05 grams (0.375 gram-mole) of calcium oxide and 200 ml. of distilled water was placed in the bomb. After sufficient time had been allowed for the lime to be slaked, the mixture was stirred and 49.5 grams (0.500 gram-mole) of pure ethylene dichloride were added. The bomb was assembled, the pressure of the system was raised to 100 p.s.i.g. by compressed air, and external heat was applied to the bomb. A particularly high reaction rate was noted at a temperature of 148° C. and a pressure of 150 p.s.i.g. The vinyl chloride product was slowly bled from the reflux condenser and collected in a Dry Ice-cooled trap. After the reaction was about one-half complete, the reflux condenser water was shut off to prevent condensation of the vinyl chloride in the reflux system. The reaction temperature rose to 170° C. with an accompanying pressure of 120 p.s.i.g., and the reaction rate continued at a high level. After approximately 100 minutes' total reaction time the reaction rate decreased rather sharply. At this point the external heat source was removed and the temperature and pressure of the system were reduced. The system was refluxed at atmospheric pressure for 10 minutes to expel vinyl chloride that had been dissolved in the reaction mixture. The total amount of vinyl chloride product collected in the ice-cooled trap was 16.6 grams (0.266 gram-mole) or 53.2% of the theoretical yield based on the total 1,2-dichloroethane originally present. Because the evolution of vinyl chloride sometimes reached the upper limits of condensing capacity, some of the vinyl chloride product escaped to the atmosphere.

In addition to the vinyl chloride, the ice-cooled trap was found to contain 0.4 gram of unreacted 1,2-dichloroethane. The calcium hydroxide in the reaction mixture was dissolved with 40 ml. of nitric acid and 2.0 grams (0.020 gram-mole) of 1,2-dichloroethane were recovered from the mixture. The aqueous portion of the reaction mixture was then diluted to 2000.0 ml. and a 10.00 ml. aliquot was titrated for chloride ion according to Volhard's method. The titration required 18.42 ml. of 0.10313 N silver nitrate indicating that 76% of the 1,2-dichloroethane had been converted to vinyl chloride.

Since modification of the process of invention will occur to those skilled in the art, it is intended that the invention be limited only by the scope of the appended claims.

What is claimed is:

1. A process for production of vinyl chloride by chemical dehydrohalogenation of 1,2-dichloroethane which comprises reacting 1,2-dichloroethane in an aqueous system with calcium hydroxide at a pressure of at least about 90 p.s.i.g. and at a temperature of at least about 125° C., conducting the vapors arising from the reaction mass to a reflux condenser maintained at a temperature cool enough to condense all of the vapors except the vinyl chloride, recycling the condensate to the reaction mass, and bleeding off the uncondensed vinyl chloride vapor from the condenser.

2. A process for production of vinyl chloride by chemical dehydrohalogenation of 1,2-dichloroethane which comprises reacting 1,2-dichloroethane in an aqueous system with calcium hydroxide at a temperature between about 125 and about 200° C. and at a pressure of at least about 90 p.s.i.g., conducting the vapors arising from the reaction mass to a reflux condenser maintained at a temperature cool enough to condense all of the vapors except the vinyl chloride, recycling the condensate to the reaction mass, and bleeding off the uncondensed vinyl chloride vapor from the condenser.

3. A process for production of vinyl chloride by chemical dehydrohalogenation of 1,2-dichloroethane which comprises reacting 1,2-dichloroethane in an aqueous system with calcium hydroxide at a pressure between 90 and 150 p.s.i.g. and at a temperature of between about 125 and about 200° C., conducting the vapors arising from the reaction mass to a reflux condenser maintained at a temperature cool enough to condense all of the vapors except the vinyl chloride, recycling the condensate to the reaction mass, and bleeding off the uncondensed vinyl chloride vapor from the condenser.

4. A process for production of vinyl chloride by chemical dehydrohalogenation of 1,2-dichloroethane which comprises reacting 1,2-dichloroethane in an aqueous system with from about a 50% to about 100% molar excess of calcium hydroxide at a temperature between about 125 and about 200° C. and at a pressure of between about 90 and 150 p.s.i.g., conducting the vapors arising from the reaction mass to a reflux condenser maintained at a temperature cool enough to condense all of the vapors except the vinyl chloride, recycling the condensate to the reaction mass, and bleeding off the uncondensed vinyl chloride vapor from the condenser.

5. A process for producing vinyl chloride comprising subjecting 1,2-dichloroethane to a reaction with an aqueous slurry of calcium hydroxide at a temperature above 125° C. but below that at which thermal dehydrochlorination occurs under pressure of between 90 and 150 p.s.i.g., and separating the products.

6. A process for producing vinyl chloride comprising introducing 1,2-dichloroethane and calcium hydroxide slurry into a closed vessel to form a reaction mixture therein, maintaining said mixture under self-generated pressure at a temperature above 125° C. but below that at which thermal dehydrochlorination occurs, and separating from the mixture a vinyl chloride having low content of impurities.

7. A process for producing a vinyl chloride monomer suitable for the manufacture of polymeric materials comprising introducing 1,2-dichloroethane and a calcium hydroxide slurry into a closed vessel to form a reaction mixture therein, maintaining said mixture under self-generated pressure at a temperature above 125° C. but below that at which thermal dehydrochlorination occurs, separating from the mixture vinyl chloride, and distilling said vinyl chloride.

References Cited in the file of this patent

UNITED STATES PATENTS

| | | |
|---|---|---|
| 1,256,757 | McElroy | Mar. 19, 1918 |
| 1,752,049 | Young | Mar. 25, 1930 |
| 2,598,646 | Maude et al. | May 27, 1952 |
| 2,610,215 | Vanharen | Sept. 9, 1952 |
| 2,681,372 | Trotter | June 15, 1954 |
| 2,877,277 | Gattiker et al. | Mar. 10, 1959 |

FOREIGN PATENTS

| | | |
|---|---|---|
| 549,799 | Great Britain | Dec. 8, 1942 |
| 638,117 | Great Britain | May 31, 1950 |